United States Patent Office 3,011,256
Patented Dec. 5, 1961

3,011,256
FLUXLESS BRAZING OF STEEL
Nikolajs Bredzs, Chicago, Ill., assignor, by mesne assignments, to Lithium Corporation of America, Inc., Minneapolis, Minn., a corporation of Minnesota
No Drawing. Filed Mar. 26, 1957, Ser. No. 648,497
2 Claims. (Cl. 29—504)

My invention relates to improvements in the brazing of metals and is especially concerned with such alloys in the brazing of metals, particularly steels, by means of certain self-fluxing brazing alloys.

In the brazing of metals, it is essential, for effective results, that the brazing metal, which, at the temperature at which the brazing operation is conducted, commonly in the range of about 700 to 1000 degrees C., is in a liquid or molten state, wet the surface of the solid metal which is to be brazed with the brazing metal. The presence of metal oxides at the interface between the solid metal to be brazed and the molten brazing metal prevents the desired wetting action. When the brazing operation is carried out in a reducing atmosphere, various of the oxides which would normally form at the elevated temperatures involved are prevented from forming and any which do form, other than those of particularly stable character, are promptly reduced. Hence, as is well known, dry reducing or inert atmospheres tend to maintain the conditions conducive to wetting and generally bring about desirable brazing results.

In many brazing operations, however, the procedure including the heating step, from a practical standpoint, must be carried out in air or in the open atmosphere and, hence, it is common practice to utilize fluxes to remove the metal oxides which inevitably form, the fluxes functioning essentially as oxide removers and oxygen barriers. Conventional brazing fluxes comprise mixtures of salts which are solid at normal temperatures and which must be melted in contact with the work or solid metal to be brazed before they are effective to bring about their intended removal of metal oxides. In other words, for best results, the flux used must be molten and active before the brazing metal bonds to the work. A satisfactory flux must also be of such character as to form a continuous, unbroken film over the joint area; even when loaded with dissolved and suspended oxides it must have a viscosity sufficiently low to assure its physical displacement by the molten brazing metal from the narrow capillary gaps of the joint; it should be easily removable from the brazed work and, if not completely removed or removable, the residue should not be of such character as to cause eventual corrosion as, for instance, by hydrolysis. It is also known that the lower the temperature at which the brazing operation can be conducted the less will be the amount of oxidation of the work before said brazing operation is completed. Since flux mixtures of very low melting point are relatively unstable at higher temperatures, some compromise is necessary. For practical purposes, a flux should be molten and active at a temperature about 90 degrees F. below the temperature at which the brazing metal starts to melt and, in addition, the flux should be stable up to the maximum temperature required during the brazing operation. So far as I am aware, none of the brazing fluxes which are in use or which have been suggested for use fully satisfies the aforementioned requirements.

In an effort to meet the problems in brazing and to eliminate the necessity for the use of either reducing atmospheres or the use of fluxes, the employment of certain self-fluxing brazing alloys has been proposed, such alloys containing constituents capable of reducing the metal oxides normally formed in the brazing operation. In this connection, it has heretofore been known, for instance, to produce self-fluxing silver base alloys containing a small precentage of lithium, generally about 1% to about 2%. Such self-fluxing alloys suffer the disadvantage, among others, that the mechanical strength of the brazed joints is low.

I have discovered that certain beryllium-lithium-copper alloys, hereafter described in detail, have particularly desirable self-fluxing brazing properties. Such alloys can be utilized with considerable effectiveness, without the necessity of using fluxes, for brazing various metals but are especially effective for brazing steels including plain carbon steels and alloy steels such as stainless steels. In a typical or illustrative instance, low carbon steel and, also, stainless steel were brazed in an inert atmosphere by the use of brazing alloys in accordance with my present invention. Extremely strong joints were obtained. Thus, tensile strengths of joints brazed with the brazing alloys pursuant to my invention were of the order of 56,000 p.s.i. in typical instances in the case of plain carbon steels and 74,000 p.s.i. in the case of 4340 steel. The brazing alloys utilized in accordance with my invention, with the important advantages of enabling the brazing operation to be carried out without extraneous fluxes, can also be used for brazing other metals, and also for brazing ceramics to metals. They also possess utility in the application of metallized coatings by spray techniques as well as in dip processes for the coating of various steels.

The beryllium content of the brazing alloys utilized in the practice of my invention will, in general, range from 0.25% to 2.5%, preferably from 0.5% to 2%, and especially from 0.8% to 1.2%.

The lithium content of said brazing alloys will, in general, range from 0.1% to 1.2%, preferably from 0.3% to 1%, and especially from 0.4% to 0.6%. It may be pointed out that it is particularly advantageous that the lithium content comprise from ¼ to ¾, and especially about ½, the amount of the beryllium content of said alloys.

The brazing alloys which are used in the practice of my invention may contain no nickel or cobalt or there may be small amounts of either cobalt or nickel or both. Thus, for instance, the cobalt content may range up to about 4% and the nickel content may also range up to about 4%. More advantageously, where cobalt or nickel or both are present, the content of the cobalt may range from 0.2% to 3%, better still from 0.2% to 1.5%. The nickle cntent may extend to a similar range when it is present at all. In any event, neither the cobalt nor the nickel should be present in such amounts as to destroy the homogeneity of the final brazing alloys.

The balance of the essential elements of the brazing alloys used in the carrying out of my invention comprises copper or copper and silver, the copper content of said alloys in any event being at least 10%. Thus, for example, the copper content may range from 10% to 98% or slightly higher. Where silver is present, therefore it may be utilized in low amounts, for example, up to 2% or 3%; or in a middle range, for instance, 30% to 60%; or in high amounts as, for example, 70% to about 88%. The brazing alloys which are particularly advantageously used in the practice of my invention are those where the copper content is of the order of 95% to 98% of said alloys.

It will be understood, of course, that minor proportions of other elements may be present or added so long as they do not unduly adversely affect the desirable self-fluxing brazing properties of the alloys.

The following examples are illustrative of typical self-fluxing brazing alloys whose use falls within the scope of my invention. It will be understood that others may readily be prepared in the light of the guiding principles and disclosures provided herein.

| Example | Percent Be | Percent Li | Percent Co | Percent Ni | Percent Ag | Percent Cu |
|---|---|---|---|---|---|---|
| 1 | 1.0 | 0.5 | 0.5 | | | 98.0 |
| 2 | 1.0 | 0.5 | 0.3 | | 48.2 | 50.0 |
| 3 | 1.0 | 0.6 | 1.5 | | 1.9 | 95.0 |
| 4 | 0.5 | 0.3 | 1.7 | | | 97.5 |
| 5 | 0.8 | 0.4 | 1.0 | 1.2 | 2.6 | 94.0 |
| 6 | 1.2 | 0.8 | 0.5 | | | 97.5 |
| 7 | 1.0 | 0.5 | 0.5 | | 88 | 10 |
| 8 | 1.0 | 0.5 | 0.5 | | 10 | 88 |
| 9 | 1.0 | 0.5 | 0.5 | 0.5 | 7.5 | 90 |
| 10 | 2.0 | 1.0 | 0.5 | | | 96.5 |
| 11 | 2.0 | 1.0 | 0.5 | | 6.5 | 90.0 |
| 12 | 2.5 | 1.3 | 0.5 | | | 95.7 |
| 13 | 2.5 | 1.3 | 0.5 | | 5.7 | 90.0 |
| 14 | 1.5 | 0.8 | | 0.2 | | 97.5 |
| 15 | 0.5 | 0.2 | 0.3 | | | 99.0 |
| 16 | 0.5 | 0.3 | 0.2 | 0.2 | 3.8 | 95.0 |
| 17 | 1.0 | 0.5 | 0.5 | | 83 | 15 |

The brazing alloys may be prepared in various ways. A suitable method of preparation is to place on the bottom of an alundum crucible copper-beryllium alloy containing, for instance, 1% to 2% beryllium and about 0.5% to 0.6% cobalt, and melt the same in a reducing atmosphere, for example, 90% nitrogen-10% hydrogen, the lithium, and other elements where used, being added in any suitable manner. It is important, in preparing these alloys, to carry out the melting operation under such conditions as to avoid losses due to oxidation. Hence, inert or reducing atmospheres should be utilized. Any losses in lithium which may occur in the melting or alloying process should be taken into account in determining the amount of lithium desired in the final brazing alloys. Said alloys can be rolled to strip form or converted to a form satisfactory for use in any given brazing operation.

As has been described above, the brazing operation, utilizing the brazing alloys described herein is carried out in appropriate inert atmospheres or reducing atmospheres. The brazing operation is best carried out without fluxes, but various types of fluxes such as dry lithium chloride can be used, although, in such cases, the full advantages of the invention are not achieved. Oxyacetylene torch brazing techniques are quite satisfactory.

What I claim as new and desire to protect by Letters Patent of the United States is:

1. In a method of brazing steels, the step which comprises carrying out the brazing operation with a self-fluxing brazing alloy consisting essentially of from 0.25% to 2.5% beryllium, up to 4% of at least one metal selected from the group consisting of nickel and cobalt, from 0.1% to 1.2% lithium, the lithium comprising from ¼ to ¾ of the amount of the beryllium, and the balance copper.

2. In a method of brazing steels, the step which comprises carrying out the brazing operation with a self-fluxing brazing alloy consisting essentially of from 0.25% to 2.5% beryllium, from 0.2% to 3% cobalt, from 0.1% to 1.2% lithium, and the balance copper.

References Cited in the file of this patent
UNITED STATES PATENTS

| | | |
|---|---|---|
| 1,923,955 | Smith | Aug. 22, 1933 |
| 2,173,254 | Hensel et al. | Sept. 19, 1939 |
| 2,181,092 | Ness | Nov. 21, 1939 |
| 2,196,305 | Hensel et al. | Apr. 9, 1940 |
| 2,196,307 | Hensel et al. | Apr. 9, 1940 |
| 2,340,362 | Atlee et al. | Feb. 1, 1944 |
| 2,534,643 | Warner | Dec. 19, 1950 |
| 2,554,233 | Ballentine et al. | May 22, 1951 |
| 2,733,168 | Hodge et al. | Jan. 31, 1956 |
| 2,768,893 | Bredzs | Oct. 30, 1956 |
| 2,793,115 | Bredzs et al. | May 21, 1957 |

FOREIGN PATENTS

| | | |
|---|---|---|
| 676,291 | Great Britain | July 23, 1952 |